United States Patent [19]
Müller et al.

[11] Patent Number: 5,137,301
[45] Date of Patent: Aug. 11, 1992

[54] LANDING GEAR FOR SEMITRAILERS AND THE LIKE

[75] Inventors: Gerald Müller, Rodgau; Rainer Spitz, Eltville; Hans Dreyer, Egelsbach-Bayerseich, all of Fed. Rep. of Germany

[73] Assignee: Jost-Werke GmbH, Neu Isenburg, Fed. Rep. of Germany

[21] Appl. No.: 687,451

[22] Filed: Apr. 18, 1991

[30] Foreign Application Priority Data

Feb. 5, 1990 [DE] Fed. Rep. of Germany ....... 4003414

[51] Int. Cl.$^5$ .............................................. B60S 9/02
[52] U.S. Cl. .............................. 280/766.1; 248/188.8
[58] Field of Search ......................... 280/763.1, 766.1; 212/189; 248/188.8; 254/418

[56] References Cited

U.S. PATENT DOCUMENTS 3,897,083  7/1975  Pickering ..................... 280/763.1

FOREIGN PATENT DOCUMENTS 0322635  7/1989  European Pat. Off. ......... 280/766.1
2187423  9/1987  United Kingdom ............ 280/763.1
2207102  1/1989  United Kingdom ............ 280/763.1

Primary Examiner—David M. Mitchell
Attorney, Agent, or Firm—Peter K. Kontler

[57] ABSTRACT

A landing gear for semitrailers has a leg the upper end of which is connected with the semitrailer and the lower end of which is connected with a ground contacting member by a load transmitting device which can turn relative to the leg about a horizontal axis back and forth to opposite sides of a neutral portion and has a part cylindrical shell which can roll on a skid between two upstranding sidewalls of the ground contacting member. The axial ends of the shell are connected with end walls which are inwardly adjacent the sidewalls and carry followers serving to track V-shaped cam slots in the adjacent sidewalls. The load transmitting device is biased to the neutral position by two leaf springs which are located at opposite sides of the pivot axis for the load transmitting device and each of which is separably connected to the leg as well as to the skid. The springs are accessible, at least in the neutral position of the load transmitting device, and extend through a circumferentially extending window in the shell. The load transmitting device and the ground contacting member can be made of metallic sheet stock.

16 Claims, 1 Drawing Sheet

LANDING GEAR FOR SEMITRAILERS AND THE LIKE

BACKGROUND OF THE INVENTION

The invention relates to semitrailers, converted semitrailers, dollies for conversion of semitrailers into full trailers, and like conveyances. More particularly, the invention relates to improvements in landing gears for semitrailers and like conveyances (hereinafter referred to as semitrailers).

Published European patent application No. 0 322 634 of Hegmann et al. discloses a landing gear wherein a leg at the underside of the front end of the semitrailer carries two rigid, heavy and thick sectorshaped panels having convex edge faces which can roll along the upper side of a heavy-duty skid forming part of a ground contacting member. The panels are thick in order to increase the area of rolling contact with the skid, and the skid is thick and heavy in order to withstand the pressure of the panels. The panels are biased to a neutral position by a block-shaped resilient buffer which is confined in a cage defined by two upstanding walls and a top wall of the ground contacting member. The buffer overlies and straddles a horizontal rod which is welded to and extends between the panels. The rod stresses the buffer when the panels are out of neutral position, and the buffer tends to dissipate energy, i.e., to return the panels to their neutral positions. The stresses upon the buffer can reach a very high value, and the buffer is subjected to additional pronounced stresses as a result of temperature changes. This causes the buffer to rapidly lose its elasticity and to undergo permanent deformation after a relatively short period of use. A replacement of the fully confined buffer is not possible and is not contemplated; therefore, any damage to the buffer necessitates replacement of the entire landing gear.

OBJECTS OF THE INVENTION

An object of the invention is to provide a simple, inexpensive, lightweight and compact but sturdy landing gear which can be used on existing semitrailers and like conveyances as a superior substitute for heretofore known landing gears.

Another object of the invention is to provide a landing gear wherein the means for biasing certain parts to their neutral positions are accessible without the need to dismantle the landing gear.

A further object of the invention is to provide a landing gear which is just as sturdy as, or even sturdier than, heretofore known landing gears even though several of its component parts can be made of lightweight metallic sheet stock.

An additional object of the invention is to provide a landing gear whose useful life is longer, and the cost of which is considerably less, than that of heretofore known landing gears.

Still another object of the invention is to provide the landing gear with novel and improved means for maintaining certain parts in their neutral positions.

A further object of the invention is to provide a novel and improved connection between the leg and the ground contacting member of the above outlined landing gear.

SUMMARY OF THE INVENTION

The invention is embodied in a landing gear which can be used with particular advantage beneath the front ends of semitrailers, in dollies for conversion of semitrailers into full trailers, and for similar purposes. The improved landing gear comprises a ground contacting member which has two spaced apart upstanding sidewalls, a leg which has a load supporting (i.e., trailer supporting) upper portion and a lower portion, and a load transmitting device which includes a part cylindrical portion having a substantially horizontal axis and being in rolling engagement with the ground contacting member between the sidewalls. The load transmitting device further comprises end walls which are disposed at and are connected to the axial ends of the part cylindrical portion and each of which is adjacent one of the sidewalls, and the landing gear further comprises a coupling which connects the end walls to the lower portion of the leg for clockwise and counterclockwise angular movements of the load supporting device about the substantially horizontal axis to both sides of a neutral position, and means for yieldably biasing the load supporting device to the neutral position. The biasing means comprises a plurality of springs each of which is connected between the ground contacting member and the leg.

The part cylindrical portion of the load transmitting device can be provided with at least one window (such window preferably extends in the circumferential direction of the part cylindrical portion) and the springs preferably include coil springs having portions which extend through the at least one window. The coil springs preferably include a first coil spring at one side and a second coil spring at the other side of the substantially horizontal axis. Means can be provided for separably connecting the springs to the leg and/or to the ground contacting member, and such connecting means is preferably accessible at least in the neutral position of the load transmitting device.

The ground contacting member preferably further comprises a runner or skid which is disposed between two sidewalls. The part cylindrical portion of the load transmitting device has a convex external surface which can extend along an arc of approximately 90° and can roll along the upper side of the skid.

The sidewalls of the ground contacting member can be provided with aligned cam slots, and the end walls of the load transmitting device are then provided with followers which extend, preferably with at least some clearance, into and are guided by the slots during angular movement of the load transmitting device relative to the leg. Such landing gear can further comprise an elongated rod which is preferably parallel to the substantially horizontal axis and has end portions constituting the aforementioned followers. The followers carry means for releasably confining the rod to movements with the end walls of the load transmitting device about the horizontal axis along a path which is defined by the cam slots.

In accordance with a presently preferred embodiment, the cam slots are substantially V-shaped and have apices which constitute the lowermost portions of such V-shaped slots. The apices receive the followers in the neutral position of the load transmitting device and are then located substantially vertically beneath the substantially horizontal axis.

The load transmitting device is movable about the aforementioned axis between first and second end positions at opposite sides of the neutral position, and the load transmitting device can be provided with suitable stops which abut the leg in the end positions of the load transmitting device. The stops can include elongated struts (e.g., in the form of laths or strips) which connect the end walls of the load transmitting device to each other and are preferably adjacent the ends of the part cylindrical portion of the load transmitting device.

The leg can comprise a plurality of elongated sections (at least one of which is or can be tubular) which are slidably telescoped into each other.

At least a portion of the load transmitting device and/or at least a portion of the ground contacting member can consist of metallic sheet material.

Cotter pins or other suitable means can be provided to separably connect the coupling to the end walls of the load transmitting device.

The end walls of the load transmitting device can be substantially sector-shaped, and the sidewalls of the ground contacting member can have a substantially trapeziform shape.

The novel features which are considered as characteristic of the invention are set forth in particular in the appended claims. The improved landing gear itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
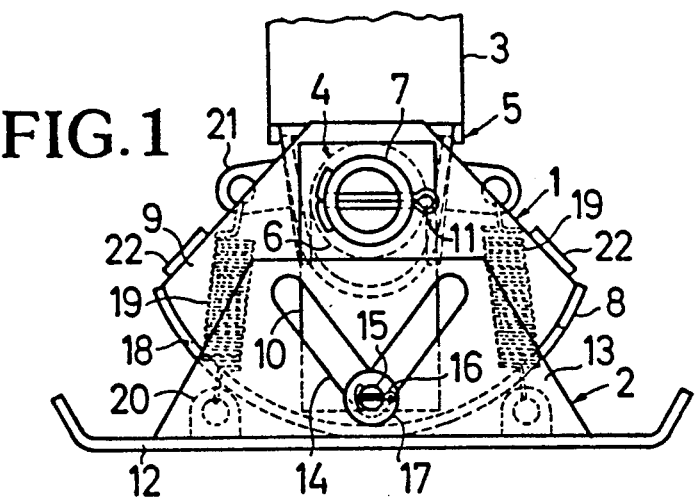
FIG. 1 is a side elevational view of a landing gear which embodies one form of the invention, the load transmitting device being shown in the neutral position.

The landing gear which is shown in the drawing comprises a leg 3 the upper portion of which supports the load (i.e., a portion of a semitrailer) and the lower portion of which is connected with a ground contacting member 2 by a load transmitting device 2. The leg 3 can include a plurality of sections (only the lower or the lowermost section is actually shown in the drawing) which are slidably telescoped into each other so that the axial length of the leg can be reduced in order to lift the member 1 above the ground.

The load transmitting device 1 comprises a part cylindrical portion 8 in the form of a shell or trough having a convex external surface which can roll along the upper side of a skid or runner 12 constituting the central part of the ground contacting member 2. The latter further comprises two spaced-apart parallel upstanding sidewalls 13 which are outwardly adjacent two end walls 9 of the device 1. The walls 9 are integral with or are otherwise fixedly connected to the respective axial ends of the part cylindrical shell 8. The means 4 for coupling the device 1 to the lower portion of the leg 3, so that the parts 8, 9, 9 of the device 1 can pivot about the horizontal axis of the shell 8, includes a support 5 which is welded or otherwise affixed to the lower portion of the leg 3 and carries a hollow cylinder 6. The horizontal axis of the cylinder 6 coincides with the axis of the shell 8, i.e., with the axis of that imaginary hollow cylinder of which the shell 8 forms a part. This shell extends along an arc of approximately 90° but can be shorter or longer (as seen in the circumferential direction of the cylinder 6.) Instead of being welded to the support 5, the cylinder 6 can be rotatably mounted on a horizontal shaft (not shown) which is then welded or otherwise secured to the support 5 or directly to the leg 3. The horizontal pivot axis which is defined by the cylinder 6 for the shell 8 is normal to the plane of FIG. 1 or 2; this axis extends in the direction of forward movement of the semitrailer, when the latter is hitched to a towing vehicle, but can also extend at right angles to such direction.

The cylinder 6 surrounds a further cylinder 7 which is rotatable and axially movable therein. The end portions of the cylinder 7 project beyond the respective ends of the cylinder 6. The outer sides of the end walls 9 can carry plate-like reinforcing elements 10 which are preferably welded thereto, and the end portions of the inner cylinder 7 of the coupling 4 extend through aligned bores or holes in the respective end wall 9 and in the adjacent reinforcing elements 10. The end walls 9 resemble sectors. The exposed end portions of the inner cylinder 7 carry diametrically extending cotter pins 11 which serve as a means for removably connecting the load transmitting device 1 with the coupling 4. The shell 8, the end walls 9 and the reinforcing elements 10 can be made of a relatively thin metallic sheet material without risking deformation and/or other damage in actual use because the described and shown configuration of the load transmitting device 1 ensures that the latter can stand pronounced deforming and other stresses. The shell 8 and the end walls 9 together constitute approximately one-fourth of a hollow cylinder having a horizontal axis which coincides with the axis of the coupling 4 and enables the external surface of the shell 8 to roll along the upper side of the skid 12.

The underside of the skid 12 engages the ground when the length of the leg 3 is increased by moving its telescoped sections relative to each other. The substantially trapeziform sidewalls 13 are normal or substantially normal to the plane of the skid 12 and, in the illustrated embodiment, are outwardly adjacent the adjoining end walls 9 of the load transmitting device 1. The sidewalls 13 are or can be welded to the skid 12. The parts 12, 13, 13 can also be made of relatively thin metallic sheet material. The free ends of the skid 12 are bent upwardly at the respective ends of the sidewalls 13.

The central portions of the sidewalls 13 are provided with substantially V-shaped cam slots 14 which are aligned with each other as seen in the direction of the common axis of the device 1 and coupling 4. The apices of the V-shaped slots 14 are constituted by their lowermost portions (i.e., those portions which are nearest to the upper side of the skid 12) and are located nearly or exactly vertically beneath the cylinders 6, 7, i.e., beneath the horizontal axis of the shell 8, when the device 1 assumes the central or neutral position of FIGS. 1 and 3. The cam slots 14 receive, with a certain amount of play, two horizontal followers which constitute the end portions of an elongated cylindrical rod 15. The central portion of the rod 15 extends through aligned holes or bores in the end walls 9 and their reinforcing elements 10. Those parts of the end portions of the rod 15 which extend outwardly beyond the respective cam slots 14 are surrounded by washers 17 and are traversed by cotter pins 16 so that the pins 16 cooperate with the respective washers 17 to releasably confine the rod 15 to sidewise movements along a path which is defined by the two aligned cam slots 14.

Figure 3:
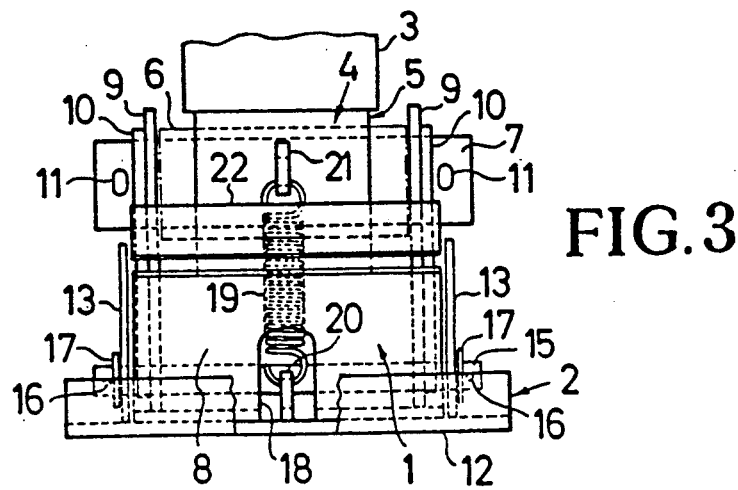
FIG. 3 is an end elevational view as seen from the left-hand side of FIG. 1, with a portion of the skid of the ground contacting member broken away.

The shell 8 of the load transmitting device 1 is formed with a circumferentially extending arcuate window 18 for intermediate portions of two elongated prestressed coil springs 19 serving as a means for biasing the device 1 to the neutral position of FIGS. 1 and 3 in which the apices of the slots 14 are located vertically beneath the pivot axis of the shell 8. The springs 19 can be made of steel wire and their upper end portions are preferably releasably (i.e., separably) connected to the leg 3 by apertured lugs 21. Similar lugs 20 are provided at the upper side of the skid 12 substantially midway between the sidewalls 13 to serve as a means for releasably (separably) connecting the lower end portions of the coil springs 19 to the ground contacting member 2. The springs 19 are located at the opposite sides of the pivot axis for the shell 8 and are or can be mirror images of each other in the neutral position of the load transmitting device 1. The left-hand spring 19 of FIG. 1 is located ahead of the right-hand spring 19 because the axis of the shell 6 is assumed to extend transversely of the direction of forward movement of the semitrailer. The upper lugs 21 are connected to or form integral parts of the support 5 for the hollow cylinder 6.

The load transmitting device 1 is preferably reinforced by two elongated struts 22 in the form of metallic strips or planks which connect the end walls 9 to each other and are preferably connected to such end walls at locations rather close to the circumferential ends of the shell 6. The reinforcing elements 22 further serve as stops one of which engages the leg 3 when the device 1 is caused to assume the right-hand end position of FIG. 2 (at one side of the axis for the shell 8) and the other of which abuts the leg 3 when the device 1 is caused to assume the other end position (not shown) at the other side of the aforementioned axis.

If the leg 3 is extended so that the underside of the skid 12 engages the ground beneath the front portion of a semitrailer, and if such ground is at least substantially even so that the skid 12 can assume the horizontal position of FIG. 1, the load transmitting device 1 is maintained in the neutral position and is biased to such position by the coil springs 19 which neutralize each other and maintain the apices of the cam slots 14 vertically beneath the axis of the shell 8. The followers (i.e., the end portions) of the rod 15 are located in such apices.

Figure 2:
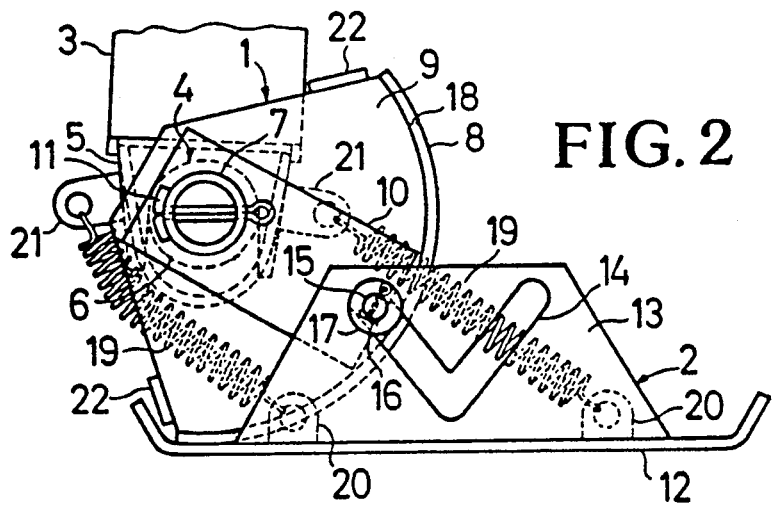
FIG. 2 is a similar side elevational view but showing the load transmitting device in one of its two end positions.

If the rear portion of the semitrailer (which is assumed to be detached from the towing vehicle) thereupon sinks (e.g., due to a defect of its suspension system, escape of air or for another reason), the orientation of the leg 3 changes from vertical to an inclination forwardly (to the left in FIG. 1) and downwardly so that the device 1 assumes the orientation which is shown in FIG. 2. This results in a rolling of the convex external surface of the shell 8 along the upper side of the skid 12 in a counterclockwise direction so that the right-hand spring 19 stores a substantial amount of energy and the length of the left-hand spring 19 is reduced. The counterclockwise pivotal movement of the device 1 comes to a halt when the right-hand reinforcing strut 22 reaches the leg 3 (see FIG. 2).

The device 1 would be caused to roll to the other end position (not shown), in which the left-hand strut 22 of FIGS. 1 and 2 would come into engagement with the leg 3) if the underside of the skid 12 were to reach a rearwardly and downwardly sloping piece of grund during extension of the leg 3, i.e., during downward movement of the coupling 4.

The two springs 19 invariably tend to return the device 1 in the neutral position of FIGS. 1 and 3 as soon as the device 1 is caused to leave such position. Therefore, when the length of the leg 3 is reduced so that the skid 12 rises above the ground, the skid automatically returns into a substantially horizontal plane and the pieces of the slots 14 in its sidewalls 13 are again located vertically beneath the axis of the shell 8. The rod 15 then cooperates with the surfaces bounding the apices of the slots 14 to properly center the device 1 relative to the leg 3 and member 2.

An advantage of the skid 12 is that it shields the shell 8 from damage, particularly against contact with pieces of rock or other hard objects when the improved landing gear happens to strike a rocky terrain in response to lengthening of the leg 3.

The springs 19 are always available for inspection, and their end portions can be reached for attachment to or detachment from the respective apertured lugs 20 and/or 21. This renders it possible to inspect the springs 19 for potential defects and to replace one or both springs within a very short period of time.

The rod 15 ensures that the ground contacting member 2 cannot become separated from the device 1 (i.e., it cannot become lost) even if the unlikely event of simultaneous breakage of both coil springs 19.

A further important advantage of the improved landing gear is that the one and/or the other leaf spring 19 can be inspected or (if necessary) replaced with a fresh spring without the need for even temporary dismantling of the landing gear, i.e., the device 1 can remain coupled to the lower portion of the leg 3 and the rod 15 can continue to connect the member 2 to the device 1.

On the other hand, the member 2 can be readily and rapidly separated from the end walls 9 of the device 1 by the simple expedient of removing one of the cotter pins 16 and by thereupon extracting the rod 15 from the adjacent slot 14, from the aligned holes or bores in the reinforcing elements 10 and end walls 9, and thereupon from the other slot 14. This renders it possible to rapidly exchange a defective or destroyed ground contacting member 2 while the device 1 remains coupled to the leg 3. Analogously, the device 1 can be rapidly detached from the leg 3 by the simple expedient of extracting one of the cotter pins 11 and by thereupon extracting the inner cylinder 7 from the outer cylinder 6 and from the aligned holes or bores of the reinforcing elements 10 and end walls 9.

An additional important advantage of the improved landing gear is that its cost and weight are but a fraction of the cost and weight of the aforedescribed landing gear of Hegmann et al. The reason is that the entire device 2, or the major part of the device 2, can be made of relatively thin sheet metal stock, the same as the ground contacting member 2. This is due to the fact that the shell 8 constitutes a portion of a hollow cylinder, i.e., the convex edge faces of the end walls 9 need not extend to and need not contact the skid 12 as is the case in the conventional landing gear. Moreover, the leaf springs 19 have a long useful life because they need not stand stresses in the range of magnitudes of those acting upon the block-shaped buffer in the landing gear of Hegmann et al.

The area of contact between the abutting surfaces of the skid 12 and shell 8 is large in each angular position of the load transmitting device 1. This ensures that the stresses per unit area of the skid 12 are relatively small which, in turn, prolongs the useful life of the member 2 as well as of the load transmitting device 1. The springs 19 are not confined in cages so that they can be inspected and are accessible for replacement at all times, at least in the neutral position of the device 1. The positions of the lugs 20, 21 for the two coil springs 19 are preferably selected in such a way that the lever arms are rather large so that it suffices to employ two relatively weak springs as a means for reliably returning the device 1 to the neutral position not later than when the lower portion of the leg 3 is moved upwardly to disengage the skid 12 from the ground below the front portion of the semitrailer. At such time, the rod 15 cooperates with the surfaces bounding the slots 14 to ensure that the device 1 invariably reassumes one and the same predetermined neutral or central position.

The struts 22 need not extend all the way between the two end walls 9 of the load transmitting device 1 if the stability of such device is satisfactory without the establishment of a connection between the end walls 9 other than by way of the shell 8. However, such struts 22 are desirable and advantageous because they not only reinforce the device 1 but can also carry out the aforementioned additional function of determining the two end positions of the load transmitting device.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

I claim:

1. A landing gear, particularly for semitrailers, comprising a ground-contacting member having two spaced-apart upstanding sidewalls; a leg having a load-supporting upper portion and a lower portion; a load transmitting device including a part cylindrical portion having a substantially horizontal axis and being in rolling engagement with said member between said sidewalls, and end walls each adjacent one of said sidewalls; a coupling connecting said end walls to said lower portion for clockwise and counterclockwise angular movements of said device about said axis to both sides of a neutral position; and means for yieldably biasing said device to said neutral position, including a plurality of springs each connected between said member and said leg, said part cylindrical portion having at least one window and said springs including coil springs having portions extending through said at least one window.

2. The landing gear of claim 1, wherein said sidewalls have a substantially trapeziform shape.

3. The landing gear of claim 1, wherein said at least one window extends in the circumferential direction of said part cylindrical portion and said coil springs include a first coil spring at one side and a second coil spring at the other side of said axis.

4. The landing gear of claim 1, wherein said member further includes a skid between said sidewalls and said part cylindrical portion has a convex external surface in rolling engagement with said skid.

5. The landing gear of claim 1, wherein said sidewalls have aligned cam slots and said end walls have followers which extend with clearance into and are guided by said slots during angular movement of said device relative to said leg.

6. The landing gear of claim 5, further comprising an elongated rod having end portions which constitute said followers, and means for releasably confining said rod to movements with said end walls about said axis along a path which is defined by said cam slots.

7. The landing gear of claim 5, wherein said cam slots are substantially V-shaped, said member having a skid between said sidewalls and said slots having apices constituting the lowermost portions of said slots, said apices receiving said followers and being located substantially vertically beneath said axis in the neutral position of said device.

8. The landing gear of claim 1, wherein said device is movable about said axis between first and second end positions at opposite sides of said neutral position, said device further including stops which abut said leg in said end positions.

9. The landing gear of claim 8, wherein said stops include elongated struts connecting said end walls adjacent said part cylindrical portion.

10. The landing gear of claim 1, wherein said part cylindrical portion extends along an arc of approximately 90°.

11. The landing gear of claim 1, further comprising means for separably connecting said springs to said leg and to said member, said connecting means being accessible at least in the neutral position of said device.

12. The landing gear of claim 1, wherein said leg includes a plurality of sections which are slidably telescoped into each other.

13. The landing gear of claim 1, wherein at least a portion of said load transmitting device consists of metallic sheet material.

14. The landing gear of claim 1, wherein at least a portion of said ground contacting member consists of metallic sheet material.

15. The landing gear of claim 1, further comprising means for separably connecting said coupling to said end walls.

16. The landing gear of claim 1, wherein said end walls are substantially sector-shaped.

* * * * *